United States Patent [19]

Sasaki et al.

[11] Patent Number: 5,216,344
[45] Date of Patent: Jun. 1, 1993

[54] INVOLUTE INTERPOLATION SPEED CONTROL SYSTEM

[75] Inventors: Takao Sasaki, Hachioji; Kunihiko Murakami, Hino; Masafumi Sano, Minamitsuru, all of Japan

[73] Assignee: Fanuc Ltd., Minamitsuru, Japan

[21] Appl. No.: 571,644

[22] PCT Filed: Jan. 10, 1990

[86] PCT No.: PCT/JP90/00028
§ 371 Date: Sep. 4, 1990
§ 102(e) Date: Sep. 4, 1990

[87] PCT Pub. No.: WO90/08992
PCT Pub. Date: Aug. 9, 1990

[30] Foreign Application Priority Data
Jan. 30, 1989 [JP] Japan ................................. 1-20065

[51] Int. Cl.$^5$ ............................................. G05B 19/25
[52] U.S. Cl. ............................... 318/573; 318/368.15; 318/574; 318/570
[58] Field of Search ............... 318/573, 568.15, 574, 318/570

[56] References Cited

U.S. PATENT DOCUMENTS

| | | | |
|---|---|---|---|
| 4,899,096 | 2/1990 | Kawamura et al. | 318/573 |
| 4,926,102 | 5/1990 | Kawamura et al. | 318/573 |
| 4,935,681 | 6/1990 | Kawamura et al. | 318/569 |
| 4,959,597 | 9/1990 | Kawamura et al. | 318/568.15 |

FOREIGN PATENT DOCUMENTS 3521072 12/1985 Fed. Rep. of Germany.

Primary Examiner—Stanley J. Witkowski
Assistant Examiner—Karen Masih
Attorney, Agent, or Firm—Staas & Halsey

[57] ABSTRACT

An involute interpolation speed control system for effecting an involute interpolation to which cutter compensation is applied when machining by a numerical control apparatus and the like, comprises a method of outputting commands for a direction in which a first involute curve as an actual machining configuration is rotated, the coordinates of the end point of the first involute curve, the position of the center of a basic circle viewed from a start point of the first involute curve, the radius of the basic circle, a feed speed, a direction in which a cutter is offset, and the radius of the cutter. The offset vector of the cutter is created based on the commands. The calculating the equation of a second involute curve connecting the start point and the end point after the offset vector has been created, is calculated. The radius of curvature of the second involute curve at the center of the cutter is determined. Also, a feed speed override value based on the direction in which the cutter is offset, the offset amount, and the radius of curvature are determined. The second involute curve based on the value obtained by multiplying the feed speed override value by the feed speed is interpolated. Thus, an interpolation is executed such that the cutting speed in a tangential direction of the outer circumference of the cutter by which an actual machining configuration is created is kept at a constant value.

4 Claims, 4 Drawing Sheets

INVOLUTE INTERPOLATION SPEED CONTROL SYSTEM

BACKGROUND OF THE INVENTION

The present invention relates to an involute interpolation speed control system to be used in machining by numerical control apparatuses and the like, and more specifically, to an involute interpolation speed control system for controlling a commanded speed in an involute interpolation to which a cutter compensation is applied.

There is a great need for the interpolation of involute curves in numerical control apparatuses or the like, when machining gears, pump impellers, or the like, and it is general practice to interpolate an involute curve with a computer or an NC programming device separate from a numerical control apparatus, convert the interpolated data to linear data on a tape, and machine a workpiece under a numerical control using the tape.

The applicant filed an application for an involute interpolation speed control system by which an involute curve is simply interpolated in a numerical control apparatus, and the speed in tangential direction thereof is made constant regardless of an angular speed, as Japanese Patent Application No. 62-157302 (Japanese Patent Laid-Open Publication No. 64-2106).

In the involute interpolation speed control system, the coordinate of a point on an involute curve is defined by the following equations.

$$X_n = R\{\cos(\theta_n + \theta_0) + \theta_n \sin(\theta_n + \theta_0)\} + X_0$$

$$Y_n = R\{\sin(\theta_n + \theta_0) - \theta_n \cos(\theta_n + \theta_0)\} + Y_0$$

$\theta_n$ is incremented by an amount determined by the following equation in the range of from $\theta_n = (\theta_s - \theta_0)$ to $\theta_n = (\theta_e - \theta_0)$, where s is a starting point and e is an end point.

$$\theta_{n+1} = \theta_n + K/(R \cdot \theta_n)$$

Then, a point $X_{n+1}$, $Y_{n+1}$ corresponding thereto is determined from the above equations, and a difference between the previous point and the present point is determined, whereby the involute curve is interpolated. The interpolation is carried out in such a manner that the increment of $\theta_n$ is set to a value, $K/(R \cdot \theta_n)$ which is inversely proportional to the increase in the angle so that the speed in the tangential direction is kept at a constant value.

The conventional involute interpolation speed control system is such that, when a cutter is compensated, an involute curve is interpolated to enable a speed in a tangential direction of the cutter on the path through which the center thereof moves (cutter path) to coincide at all times with a commanded feed speed. Therefore, as shown in FIG. 4, a cutter W is offset to the concave side of an involute curve (path commanded by a program) In1, and a ratio of a speed in a tangential direction of the cutter W at the center thereof to a cutting speed at an actual cutting point Pss is made equal to a ratio of a value obtained by subtracting a cutter radius from the radius of curvature of an involute curve (cutter path) In2 at the cutting point Pss to the above radius of curvature. This ratio is made larger as the cutter W approaches a basic circle C and as a result, an actual cutting speed is made larger than a commanded feed speed. Whereas, when the cutter W is offset to the convex side of the involute curve In1, as the cutter W approaches the basic circle C, the actual cutting speed is made smaller than the commanded feed speed.

Therefore, a problem arises in that a speed of the outer circumference (cutting point Pss) of the cutter on the path In2 commanded by the program, which is the actual cutting speed, is constantly changed in accordance with the change of curvature of the involute curve, and thus a workpiece cannot be smoothly machined.

SUMMARY OF THE INVENTION

An object of the present invention is to provide an involute interpolation speed control system by which the cutting speed of the outer circumference of a cutter for creating an actual cut configuration always coincides with a commanded speed in an involute interpolation to which a cutter compensation is applied.

To achieve this object, in accordance with the present invention, there is provided an involute interpolation speed control system for effecting an involute interpolation to which a cutter compensation is applied for a machining by a numerical control apparatus and the like, comprising the steps of:

outputting commands for a direction in which a first involute curve as an actual machining configuration is rotated, the coordinates of the end point of the first involute curve, the position of the center of a basic circle as viewed from the start point of the first involute curve, the radius of the basic circle, a feed speed, a direction in which a cutter is offset, and the offset amount of the cutter, creating the offset vector of the cutter based on the commands, calculating the equation of a second involute curve connecting the start point and the end point after the offset vector has been created, determining the radius of curvature of the second involute curve at the center of the cutter, determining a feed speed override value based on the direction in which the cutter is offset, the offset amount, and the radius of curvature, and interpolating the second involute curve based on the value obtained by multiplying the feed speed override value by the feed speed.

The offset vector of the cutter is created based on commands relating to the first involute curve as an actual machining configuration, and thus the equations of the second involute curve as a cutter path are calculated. The feed speed override value V is determined based on the radius of curvature of the thus calculated second involute curve. The second involute curve is interpolated based on the value obtained by multiplying a commanded feed speed by the feed speed override value K. With this arrangement, the interpolation is executed in such a manner that the cutting speed in a tangential direction of the outer circumference of the cutter by which an actual machining configuration is created is kept at a constant value.

At that time, the involute curve is shown as the function of the central angle $\theta_n$ of the basic circle and the involute curve is interpolated by increasing the angle $\theta_n$. The increment of the angle $\theta_n$ is set to $V \cdot K/(R \cdot \theta_n)$, which is inversely proportional to the increase of the angle $\theta_n$.

DESCRIPTION OF THE PREFERRED EMBODIMENT

An embodiment of the present invention will be described below with reference to the drawings.

Figure 1:
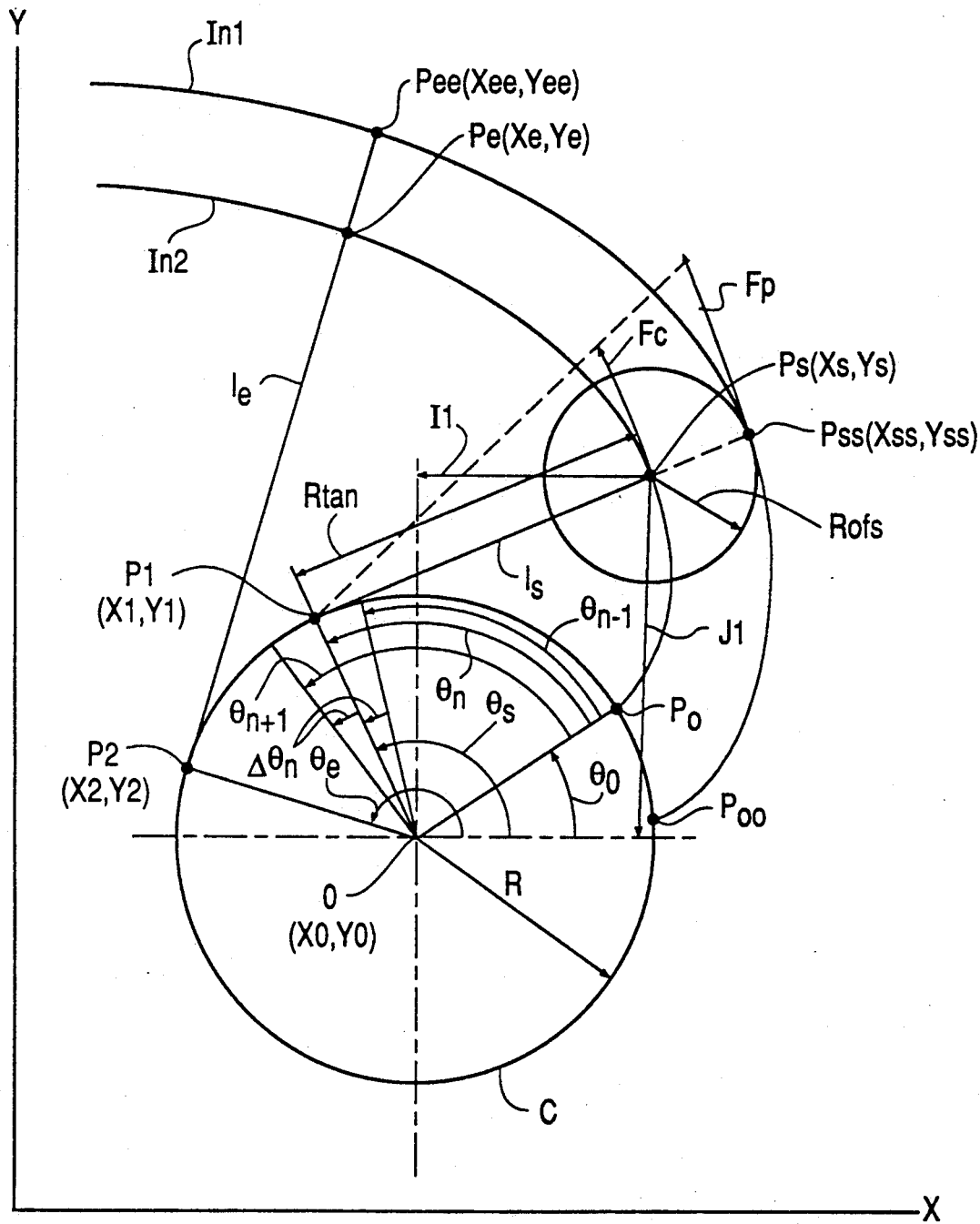
FIG. 1 is a diagram showing the interpolation of an involute curve, when a cutter is positioned on the concave side of a commanded involute curve.
Figure 2:
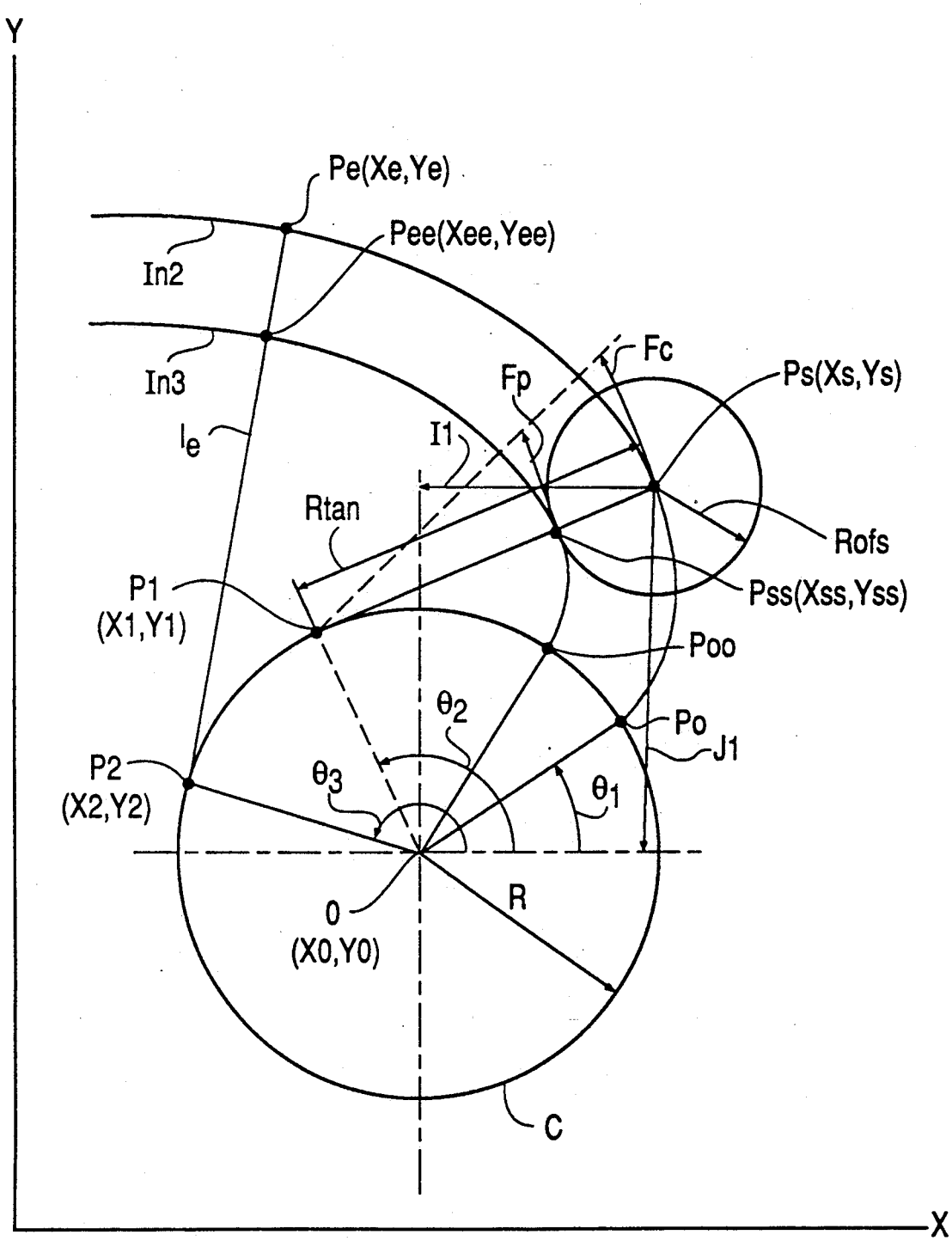
FIG. 2 is a diagram showing the interpolation of an involute curve, when a cutter is positioned on the convex side of a commanded involute curve.

FIG. 1 shows the interpolation of an involute curve when a cutter is positioned on the concave side of a commanded involute curve in which the cutter is rotated counterclockwise and moves away from a basic circle. In this case, a command G03.1 is used. FIG. 2 shows the interpolation when the cutter is positioned on the convex side of the commanded involute curve. Although there are cases in which the cutter moves toward the basic circle, rotates clockwise, and the like, in addition to the above cases, they are basically the same, and thus the present invention will be described based on FIGS. 1 and 2. In these figures, the involute curve is created based on the basic circle C. The center O of the basic circle C has coordinates ($X_0$, $Y_0$) and a radius R, and a point Poo is a start point of the involute curve In1.

A point Pss ($X_{ss}$, $Y_{ss}$) is the point from which the cutter starts the actual cutting, a tangential line $\lambda s$ is drawn from the point Pss to the basic circle C, and the coordinates of the contact point P1 thereof are ($X_1$, $Y_1$). An angle between a line OP1 connecting the point P1 with the center O of the basic circle C and the X-axis is an angle $\theta_s$.

A point Pee ($X_{ee}$, $Y_{ee}$) is the point at which the cutter ends the actual cutting, and a tangential line $\lambda e$ is drawn from the point Pee to the basic circle C and the coordinate of the contact point P2 thereof is ($X_2$, $Y_2$). An angle between a line OP2 connecting the point P2 with the center O of the basic circle C and the X axis is an angle $\theta_e$.

Here, commands for involute interpolation are given by:

G17G03.1G41X—Y—I—J—R—F—D—;

G17 is a command for specifying a plane: i.e., G17 specifies the X-Y plane, G18 specifies the Z-X plane, and G19 specifies the Y-Z plane.

G03.1 is a counterclockwise involute interpolation command. If the involute curve were clockwise, it would be commanded by G02.1. Whether the involute curve moves toward or away from the basic circle C depends on the coordinates the start point Poo and the end point Pee of the involute curve In1.

G41 is a command for offsetting a cutter to the left side with respect to the direction of movement thereof and thus the cutter is positioned on the concave side of the involute curve In1. When the cutter is to be positioned on the right side of the involute curve In1, a G42 command is output.

X—Y—designates coordinates of the end point of the involute curve In1 having a value Pee ($X_{ee}$, $Y_{ee}$) in the figure. These coordinates are commanded by absolute values.

I—J—indicates the values of the center O of the basic circle C as viewed from the start point Pss ($X_{ss}$, $Y_{ss}$), and is commanded by incremental values.

R—represents the radius R of the basic circle C, F—represents a feed speed, D—is a code for specifying an offset amount and an offset number is commanded by a number following D, and the mark; indicates the end of a block.

An offset vector is created from the command, and accordingly the equation of an involute curve In2 connecting a curve start point Po after the offset vector has been created. An interpolation start point Ps ($X_s$, $Y_s$) and an interpolation end point Pe ($X_e$, $Y_e$) are determined.

(1) Determination of the coordinates ($X_0$, $Y_0$) of the center O of the basic circle C:

Although the coordinates of the start point Ps ($X_s$, $Y_s$) of the involute curve are included in the commanded values, they are stored in a numerical control apparatus as a present position. The coordinates ($X_0$, $Y_0$) of the center O of the basic circle C are determined from the following equations based on the start point Ps ($X_s$, $Y_s$) and the distances (I1, J1) from the start point Ps to the center O of the basic circle C, as viewed from the start point Ps.

$$X_0 = X_s + I1$$

$$Y_0 = X_s + J1$$

(2) Determination of the angle $\theta_s$ of the start point Ps of the involute curve:

A tangential line $\lambda s$ is drawn from the start point Ps ($X_s$, $Y_s$) to the basic circle C, and the contact point thereof is defined as $P_1$ ($X_1$, $Y_1$). The point $P_1$ is connected with the center O of the basic circle C, and an angle between the thus obtained line and the X-axis is determined, as the angle $\theta_s$ of the start point Ps of the involute curve In2. This angle also can be determined from the cutting start point Pss.

(3) Determination of the angle $\theta_e$ of the end point of the involute curve:

A tangential line $\lambda e$ is drawn from the end point Pe ($X_e$, $Y_e$) of the involute curve to the basic circle C and the contact point thereof is defined as $P_2$ ($X_2$, $Y_2$), the point $P_2$ is connected with the center O of the basic circle C, and an angle between the thus obtained line and the X-axis is determined as the angle $\theta_e$ of the end point of the involute curve. This angle also can be determined from the cutting end point Pee.

(4) Determination of the angle $\theta_0$ of the curve start point Po of the involute curve:

The length of the arc between the points $P_1$ and $P_0$ is equal to the length of the straight line $\lambda s$ from the definition of the involute curve. Therefore, if the length of the straight line $\lambda s$ is L, then the angle $\theta_0$ for the start point of the involute curve can be determined by:

$$\theta_0 = \theta_s - L/R \text{ (radian)}$$

(5) From the above values, the coordinates of a point on the involute curve In2 after the interpolation has been effected are given as follows:

$$X_n = R\{\cos(\theta_n + \theta_0) + \theta_n \sin(\theta_n + \theta_0)\} + X_0 \quad (1)$$

$$Y_n = R\{\sin(\theta_n + \theta_0) - \theta_n \cos(\theta_n + \theta_0)\} + Y_0 \quad (2)$$

where, X and Y represent the present position, $X_0$ and $Y_0$ represent the coordinates of the center O of the basic circle C, $\theta_n$ represents an angle, and $\theta_0$ represents the angle of the curve start point of the involute curve.

The radius of curvature (Rtan) of the involute curve is determined when the center of the cutter is at the present position (at the start point when the involute interpolation is begun).

The radius of curvature (Rtan) of the involute curve is determined by the following equation when the angle is $\theta_n$.

$$Rtan = R \cdot \theta_n$$

A feed speed override value V is set based on the radius of curvature Rtan, the direction of commanded cutter compensation, and the radius of the cutter. The value V represents the value for compensating the velocity. That is, if a cutter is positioned on a concave curve side of an involute curve, an actual cutting speed is made larger than a commanded feed speed. As a result, the velocity is decreased to compensate the increased cutting speed. In contrast, if the cutter is positioned on a convex side of the curve, the actual cutting speed is made smaller than a commanded feed speed. As a result, the velocity is increased to compensate the decreased cutting speed. Note that Rofs represents the radius of the cutter.

Assuming that the radius of the cutter (offset amount) is Rtan, a radius of curvature of the involute curve at the cutting point is Rtan, a commanded feed speed is F, a speed in the tangential direction of the center of the cutter is Fc, and an actual cutting speed is Fp, then the relationship between Fc and Fp is determined as follows. More specifically, when the cutter is on the convex side of the involute curve, the following equation is established:

$$Fc = Fp \cdot Rtan/(Rtan - Rofs)$$

and when the cutter is on the concave side of the involute curve, the following equation is established:

$$Fc = Fp \cdot Rtan/(Rtan + Rofs)$$

Therefore, when the cutter is on the concave side of the commanded involute curve as shown in FIG. 1, the feed speed override value V is determined by the following equation.

$$V = (Rtan + Rofs)/Rtan \quad (3)$$

When the cutter is on the convex side of the involute curve commanded as shown in FIG. 2, the feed speed override value V is determined by the following equation.

$$V = (Rtan - Rofs)/Rtan \quad (4)$$

The involute interpolation is executed using a value determined by the thus obtained feed speed override value multiplied by the commanded feed speed F.

When $\theta$ is incremented by certain angles in the range of from $\theta_n = (\theta_s - \theta_0)$ to $\theta_n = (\theta_e - \theta_0)$, the radius of the involute curve is increased with an increase of the angle $\theta_n$, and thus the speed of the outer circumference of the cutter (cutting point) on the path commanded by a program, which is the actual cutting speed, is changed as the curvature of the involute curve is constantly changed. Therefore, the increment of the angle $\theta_n$ must be controlled so that the speed of the outer circumference of the cutter (cutting point) on the involute curve is kept constant.

Here, from the above equations (1) and (2), $$(dX/d\theta_n) = R \cdot \theta_n \cdot \cos(\theta_n + \theta_0)$$
$$(dY/d\theta_n) = R \cdot \theta_n \cdot \sin(\theta_n + \theta_0)$$
$$\Delta\theta_n = \Delta l/(R \cdot \theta_n)$$

Therefore, $$d\theta = (d\lambda/R \cdot \theta)$$

To determine a difference here, $$\Delta\theta n = (\Delta\lambda/R \cdot \theta)$$

Since $\Delta\lambda$ is a distance to be moved in a given time, $$\Delta\lambda = K = \tau \cdot (F/60)$$

where, $\tau$ represents a pulse distribution cycle (involute interpolation cycle) having a unit of seconds and F represents a feed speed having a unit of mm/min.

Therefore, an increment $\Delta\theta$ of $\theta_O$ is determined by multiplying the feed speed override value V by a feed speed F as shown by the following equation.

$$\Delta\theta_n = V \cdot K/R \cdot \theta)$$

Then $\theta_n$ is sequentially changed as shown by the following equation.

$$\theta_{n+1} = \theta_n + \Delta\theta_n$$

Then $X_{n+1}$, $Y_{n+1}$ corresponding to the $\theta_{n+1}$ is determined and a difference between the previous $X_n$, $Y_n$ is output as a distribution pulse, whereby a speed in a tangential direction at a cutting point can be controlled to be a constant value.

When the cutter moves to the vicinity of the basic circle C of the involute curve, the following parameters are prepared to cope with the possibility that the feed speed override value V is made zero or infinite.

When the cutter is positioned on the concave side of the involute curve, a maximum acceleration ratio Vmax is set. In the involute interpolation speed control sytem, the feed speed override value is clamped, using this maximum acceleration ratio as an upper limit value.

When the cutter is positioned on the convex side of the involute curve, a minimum acceleration ratio Vmin is set. In the involute interpolation speed control system, the feed speed override value is clamped, using this minimum acceleration ratio as a lower limit value.

As described above, the interpolation is carried out so that the speed at a cutting point is kept at a constant value.

Figure 3:
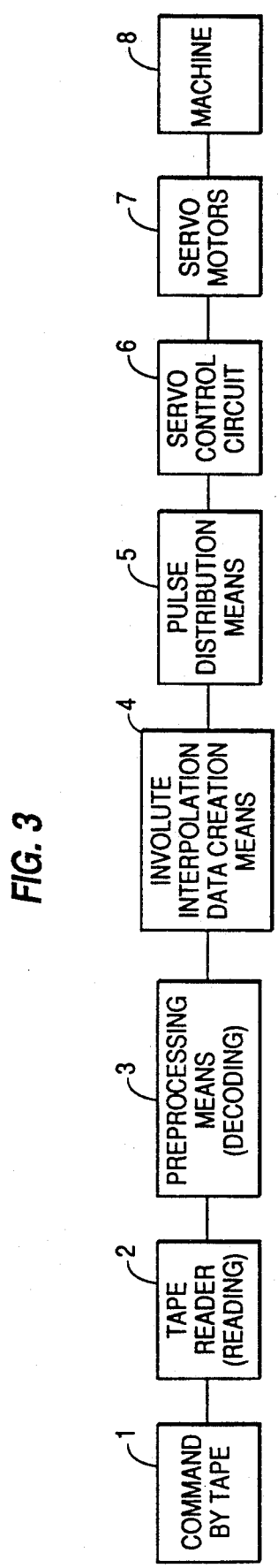
FIG. 3 is a block diagram showing a numerical control apparatus according to the present invention.
Figure 4:
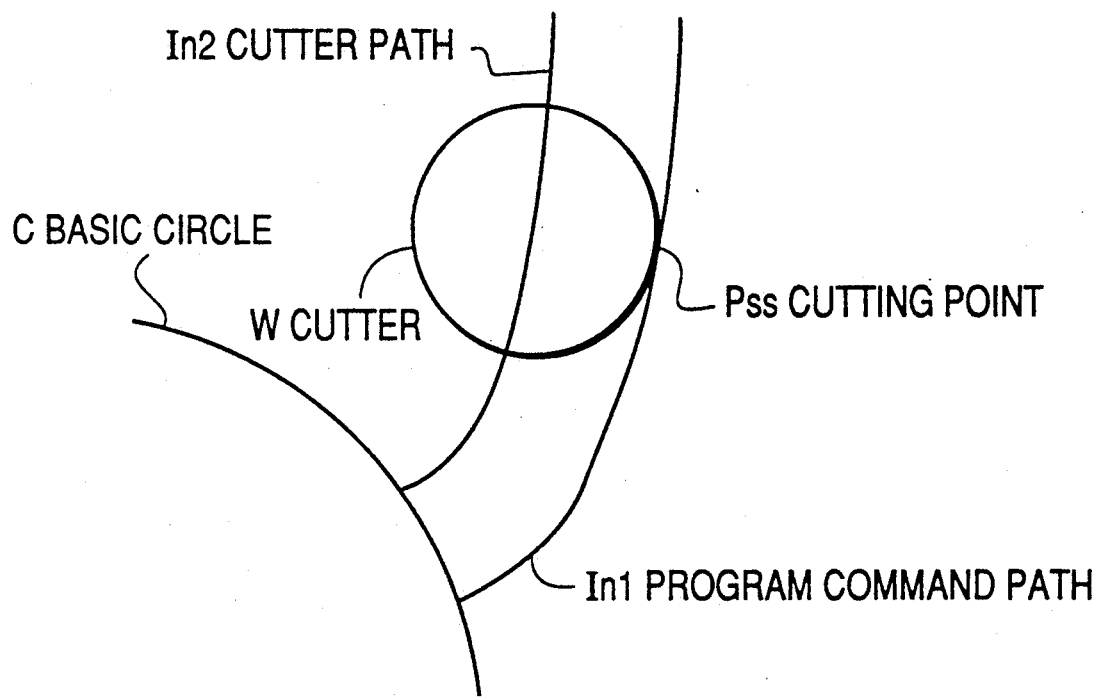
FIG. 4 is a diagram showing the conventional interpolation of an involute curve to which a cutter compensation is applied.

FIG. 3 shows a schematic diagram of the numerical control apparatus according to the present invention. The numerical control apparatus includes tape commands 1 in the form of a tape in which the above commands are punched, a tape reader 2 for reading the tape 1, a preprocessing means 3 for determining from G codes whether an involute interpolation command exists, an involute interpolation data generating means 4 for generating, from commands, data necessary for effecting the involute interpolation as described above, and a pulse distributing means 5 for incrementing $\theta$ so that the speed at the tangential angle of the involute curve is kept at a constant value based on the above equations, to determine the respective points on the involute curve, to effect an interpolation, and to distribute pulses. The numerical control apparatus also includes a servo control circuit for driving servomotors 7 by the commands, to cause ball screws or the like to move a machine 8.

As described above, according to the present invention, since data for interpolating an involute curve to which a cutter compensation is applied is calculated in a numerical control apparatus, and a cutting speed of the outer circumference of a cutter for creating an actual cutting configuration coincides at all times with a commanded speed, the machining speed of the involute curve is always kept at a constant value.

We claim:

1. A method for speed control in an involute interpolation speed control system including a cutter, for effecting an involute interpolation to which a cutter compensation is applied when machining by a numerical control apparatus, said method comprising the steps of:

a) reading commands from a command storage unit, for generating data regarding a direction in which a first involute curve as an actual machining configuration is rotated, coordinates of the end point of the first involute curve, a position of a center of a basic circle as viewed from a start point of the first involute curve, a radius of the basic circle, a feed speed, a direction in which the cutter is offset, and an amount of offset of the cutter;

b) creating an offset vector of the cutter based on the commands;

c) calculating an equation of a second involute curve connecting a start point and an end point after the offset vector has been created;

d) determining a radius of curvature of the second involute curve at a center of the cutter;

e) determining a feed speed override value based on the direction in which the cutter is offset, the offset amount, and the radius of curvature;

f) interpolating, in a pulse distributing unit, the second involute curve based on a value obtained by multiplying the feed speed override value by the feed speed; and g) controlling the cutter based on the second involute curve interpolated in said step (f), so that a cutting speed of the cutter is maintained at a constant value.

2. A method for speed control in an involute interpolation speed control system according to claim 1, wherein the second involute curve is calculated by the steps of:

h) determining the coordinates $(X_0, Y_0)$ of the center of the basic circle of the second involute curve, the angle $\Theta_s$ of the start point thereof, the angle $\Theta_e$ of the end point thereof, and the curve start angle $\Theta_0$ thereof based on the commands and the coordinates of the start point of the second involute curve; and i) obtaining the coordinates of a point on the second involute curve from the following equations based on the thus determined values;

$$X_n = R\{\cos(\Theta_n + \Theta_0) + \Theta_n \sin(\Theta_n + \Theta_0)\} + X_0$$

$$Y_n = R\{\sin(\Theta_n + \Theta_0) - \Theta_n \sin(\Theta_n + \Theta_0)\} + Y_0$$

wherein $X_n$ and $Y_n$ are coordinates of the act point of the second involute curve, $\Theta_n$ representing an angle and $\Theta_O$ representing the angle of the curve start point of the first involute curve, and R being the radius of the basic circle.

3. A method for speed control in an involute interpolation speed control system according to claim 2 wherein, when the cutter is positioned on the concave side of the first commanded involute curve, the feed speed override value V is determined by $$V = (\text{Rtan} + \text{Rofs})/\text{Rtan}$$

where Rtan is the radius of curvature of the second involute curve, and Rofs is the offset amount, and when the cutter is positioned on the convex side of the first commanded involute curve, the feed speed override value V is determined by $$V = (\text{Rtan} - \text{Rofs})/\text{Rtan}$$

and wherein $\theta_n$ is incremented based on the following equation in the range of from $\theta_n = (\theta_s - \theta_0)$ to $\theta_n = (\theta_e - \theta_0)$;

$$\theta_{n+1} = \theta_n + V \cdot K/(R \cdot \theta_n)$$

and, a point $X_{n+1}, Y_{n+1}$ corresponding thereto is determined from the above equations to obtain a difference between the previous point and the present point, whereby the second involute curve is interpolated.

4. A method for speed control in an involute interpolation speed control system according to claim 3, wherein when the cutter is positioned on the concave side of the first commanded involute curve a maximum acceleration ratio Vmax is set, when the cutter is positioned on the convex side of the first commanded involute curve a minimum acceleration ratio Vmin is set, and the feed speed override value is clamped in the involute interpolation speed control system using the maximum acceleration ratio Vmax as an upper limit value and the minimum acceleration ratio Vmin as a lower limit value.

* * * * *

UNITED STATES PATENT AND TRADEMARK OFFICE
CERTIFICATE OF CORRECTION

PATENT NO. : 5,216,344　　　　　　　　　　　Page 1 of 2
DATED    : JUNE 1, 1993
INVENTOR(S) : TAKAO SASAKI ET AL.

It is certified that error appears in the above-indentified patent and that said Letters Patent is hereby corrected as shown below:

On the title page: Item
　　[57] ABSTRACT
　　　line 13, "calculating the" should be deleted.

Col. 3, line 36, "λ s" should be --ℓs--;
　　　　line 43, "λe" should be --ℓe--.

Col. 4, line 37, "λs" should be --ℓs--;
　　　　line 47, "λe" should be --ℓe--;
　　　　line 58, "λs" should be --ℓs--;
　　　　line 60, "λs" should be --ℓs--.

Col. 6, line 12, "$\Delta\theta_n = \Delta\ell/(R\cdot\theta_n)$" should be
　　　　$--(d\ell/d\theta_n) = \sqrt{(dX/d\theta_n)^2 + (dY/d\theta_n)^2} = R\cdot\theta_n--;$ line 16, "dλ/" should be --dℓ/--;
　　　　line 20, "$(\Delta\lambda/R\cdot\theta)$" should be --$(\Delta\ell/R\cdot\theta_n)$--;
　　　　line 22, "Δλ" should be --Δℓ--;
　　　　line 24, "Δλ" should be --Δℓ--;
　　　　line 29, "$\theta_0$" should be --$\theta_n$--;
　　　　line 33, "$R\cdot\theta)$" should be --$R\cdot\theta_n)$--.

UNITED STATES PATENT AND TRADEMARK OFFICE
CERTIFICATE OF CORRECTION

PATENT NO. : 5,216,344

DATED : JUNE 1, 1993

INVENTOR(S) : TAKAO SASAKI ET AL.

It is certified that error appears in the above-indentified patent and that said Letters Patent is hereby corrected as shown below:

Col. 8, line 18, "$\theta_0$" should be --$\theta_0$--.

Signed and Sealed this

Twenty-second Day of March, 1994

Attest:

BRUCE LEHMAN

*Attesting Officer*  *Commissioner of Patents and Trademarks*